US012309906B2

(12) United States Patent
Sugiyama

(10) Patent No.: US 12,309,906 B2
(45) Date of Patent: May 20, 2025

(54) MICROWAVE OVEN

(71) Applicant: MAKITA CORPORATION, Anjo (JP)

(72) Inventor: Masashi Sugiyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 804 days.

(21) Appl. No.: 17/535,009

(22) Filed: Nov. 24, 2021

(65) Prior Publication Data

US 2022/0210878 A1 Jun. 30, 2022

(30) Foreign Application Priority Data

Dec. 28, 2020 (JP) ................................ 2020-218488
Aug. 5, 2021 (JP) ................................ 2021-129214

(51) Int. Cl.
*H05B 6/80* (2006.01)
*H05B 6/64* (2006.01)
*H05B 6/66* (2006.01)

(52) U.S. Cl.
CPC ............ *H05B 6/80* (2013.01); *H05B 6/6414* (2013.01); *H05B 6/6423* (2013.01); *H05B 6/6426* (2013.01); *H05B 6/664* (2013.01); *H05B 6/6435* (2013.01)

(58) Field of Classification Search
CPC .......... H05B 6/00; H05B 6/64; H05B 6/6402; H05B 6/6414; H05B 6/642; H05B 6/6423; H05B 6/6426; H05B 6/6429; H05B 6/6435; H05B 6/6479; H05B 6/664; H05B 6/686; H05B 6/80
See application file for complete search history.

(56) References Cited

U.S. PATENT DOCUMENTS 4,282,416 A * 8/1981 White .................. H05B 6/6426 126/21 R
2001/0045430 A1* 11/2001 Mawoud .............. H05B 6/6402 219/715
2008/0217327 A1* 9/2008 Herrera ................ H05B 6/6426 219/719

(Continued)

FOREIGN PATENT DOCUMENTS

JP S47-034551 U 12/1972
JP H06-082046 A 3/1994

(Continued)

OTHER PUBLICATIONS

Feb. 12, 2025 Office Action issued in Japanese Patent Application No. 2021-129214.

*Primary Examiner* — Hung D Nguyen
(74) *Attorney, Agent, or Firm* — Oliff PLC

(57) ABSTRACT

A microwave oven avoids being upsized. The microwave oven includes a housing including a cooking chamber inside the housing, a component chamber inside the housing, a first opening in a front portion of the housing and communicating with the cooking chamber, and an outlet in a rear portion of the housing and allowing air to be discharged from the component chamber to flow through the outlet. The microwave oven also includes a heat-generating component in the component chamber, a door at a front portion of the housing to cover and uncover the first opening, and a battery mount at a rear portion of the housing to detachably receive a battery pack.

20 Claims, 15 Drawing Sheets

(56) References Cited

U.S. PATENT DOCUMENTS

| | | | | |
|---|---|---|---|---|
| 2009/0114641 | A1 * | 5/2009 | Van Dyke | H05B 6/6426 219/679 |

FOREIGN PATENT DOCUMENTS

| | | | | | |
|---|---|---|---|---|---|
| JP | H11014071 | A | * | 1/1999 | |
| JP | 2017207260 | A | * | 11/2017 | |
| KR | 199-014038 | U | * | 2/1999 | |
| KR | 2000-0051389 | A | * | 8/2000 | |
| WO | WO-2016179317 | A1 | * | 11/2016 | |
| WO | WO-2018225626 | A1 | * | 12/2018 | F24C 7/02 |

* cited by examiner

MICROWAVE OVEN

CROSS-REFERENCE TO RELATED APPLICATIONS

This application claims the benefit of priority to Japanese Patent Application No. 2020-218488, filed on Dec. 28, 2020, and Japanese Patent Application No. 2021-129214, filed on Aug. 5, 2021, the entire contents of which are hereby incorporated by reference.

BACKGROUND

1. Technical Field

The present disclosure relates to a microwave oven.

2. Description of the Background

In the field of microwave ovens, a known portable electromagnetic cooking device is operable on power supplied from a power tool battery, as described in WO 2018/225626.

BRIEF SUMMARY

A portable microwave oven may be used at a work site or an evacuation site. A portable microwave oven may be carried by a user. A microwave oven is thus to be downsized.

One or more aspects of the present disclosure are directed to a microwave oven that avoids being upsized.

A first aspect of the present disclosure provides a microwave oven, including:

- a housing including
  - a cooking chamber inside the housing,
  - a component chamber inside the housing,
  - a first opening in a front portion of the housing, the first opening communicating with the cooking chamber, and
  - an outlet in a rear portion of the housing, the outlet allowing air to be discharged from the component chamber to flow through the outlet;
- a heat-generating component in the component chamber;
- a door at a front portion of the housing, the door being configured to cover and uncover the first opening; and
- a battery mount at a rear portion of the housing, the battery mount being configured to detachably receive a battery pack.

A second aspect of the present disclosure provides a microwave oven, including:

- a housing including
  - a cooking chamber inside the housing,
  - a component chamber inside the housing and below the cooking chamber,
  - a first opening in a front portion of the housing, the first opening communicating with the cooking chamber,
  - an inlet in a front portion of the housing and below the first opening, the inlet allowing air to be drawn into the component chamber to flow through the inlet, and
  - an outlet in a rear portion of the housing, the outlet allowing air to be discharged from the component chamber to flow through the outlet;
- a heat-generating component in the component chamber;
- a door at a front portion of the housing, the door being configured to cover and uncover the first opening;

- a battery mount at a rear portion of the housing and above the outlet, the battery mount being configured to detachably receive a battery pack;
- a handle joined to an upper portion of the housing with a hinge having a hinge axis extending in a lateral direction; and
- an interface in a front portion of the housing and above the first opening, the interface including at least a power button.

The microwave oven according to the above aspects of the present disclosure avoids being upsized.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as front and rear (or forward and backward), right and left (or lateral), and up and down (or vertical). The terms indicate relative positions or directions with respect to the center of a microwave oven 1.

Microwave Oven

Figure 1:
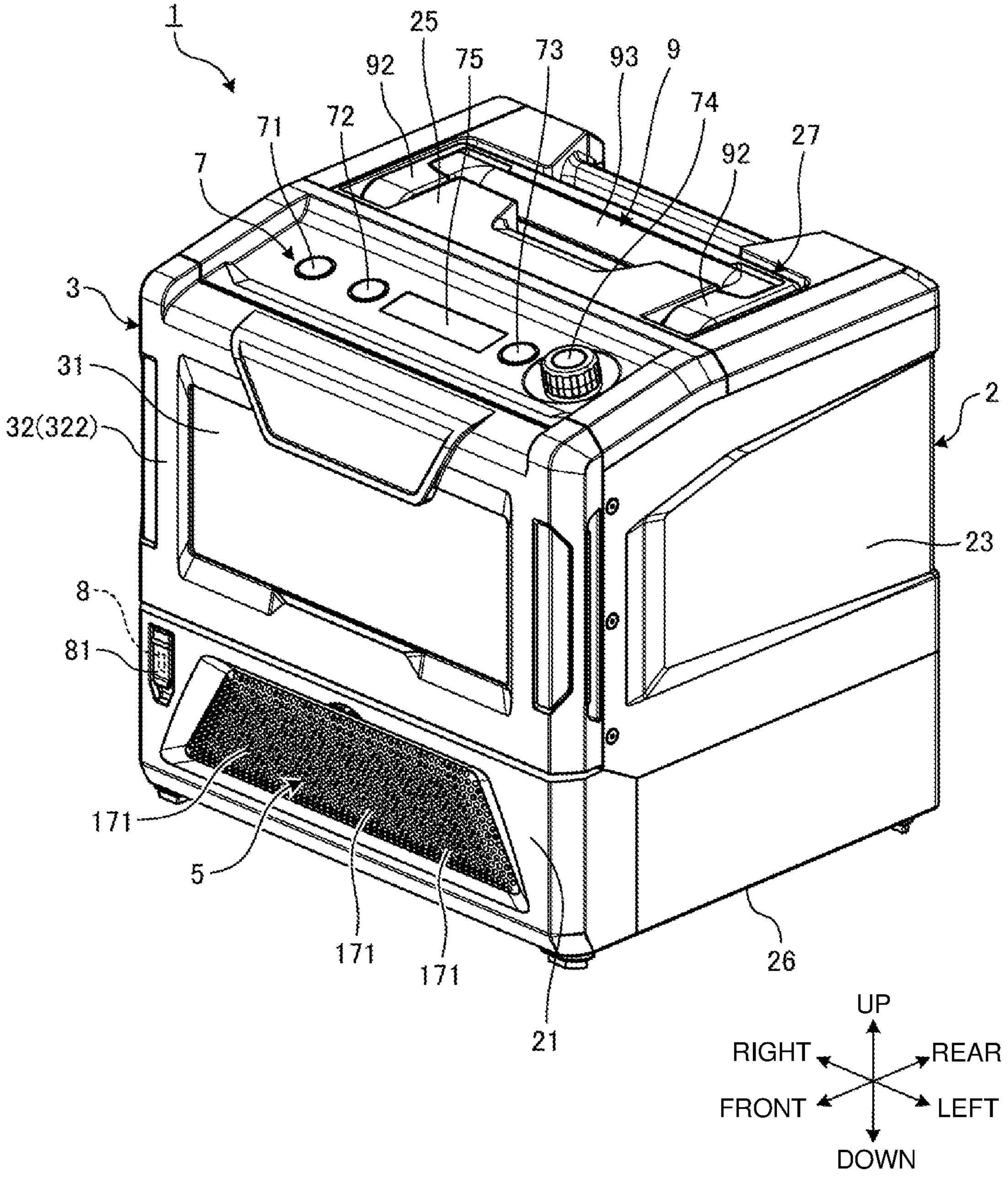
FIG. 1 is a perspective view of a microwave oven according to an embodiment as viewed from the left front.
Figure 2:
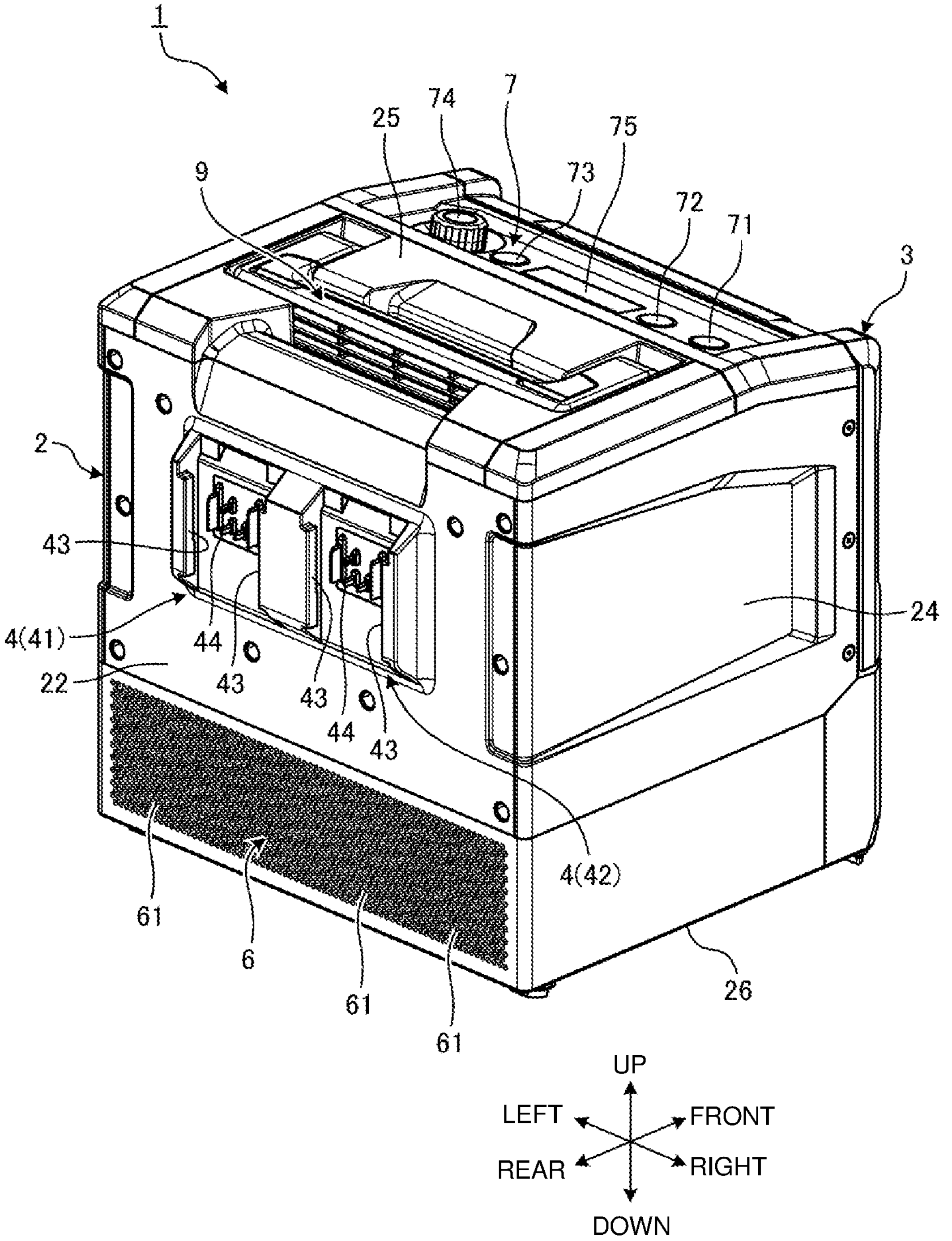
FIG. 2 is a perspective view of the microwave oven according to the embodiment as viewed from the right rear.

FIG. 1 is a perspective view of the microwave oven 1 according to an embodiment as viewed from the left front. FIG. 2 is a perspective view of the microwave oven 1 according to the embodiment as viewed from the right rear.

Figure 3:
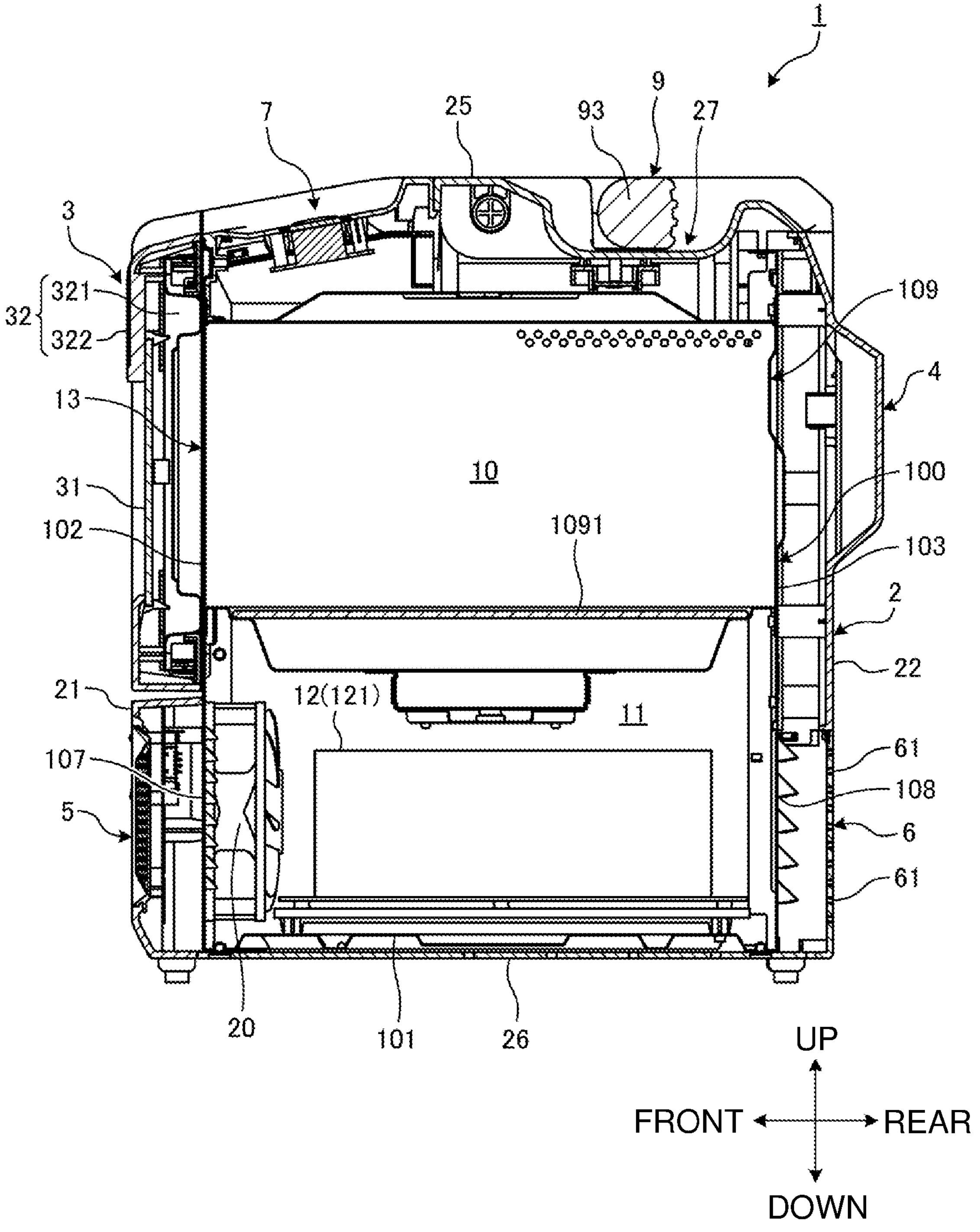
FIG. 3 is a cross-sectional view of the microwave oven according to the embodiment.

FIG. 3 is a cross-sectional view of the microwave oven 1 according to the embodiment.

The microwave oven 1 is a portable microwave oven. A user can use the microwave oven 1 at a work site such as a building site or a construction site. A user can use the microwave oven 1 at a disaster evacuation site. The user can carry the microwave oven 1.

As shown in FIGS. 1 to 3, the microwave oven 1 includes a housing 2, a metal plate member 100, a door 3, battery mounts 4, inlets 5, outlets 6, an interface 7, an output terminal 8, and a handle 9.

The housing 2 is formed from a synthetic resin. The housing 2 has a surface. The surface of the housing 2 includes a front surface 21, a rear surface 22, a left surface 23, a right surface 24, an upper surface 25, and a lower surface 26. The front surface 21 faces frontward. The rear surface 22 faces rearward. The left surface 23 faces leftward. The right surface 24 faces rightward. The upper surface 25 faces upward. The lower surface 26 faces downward.

The housing 2 includes a cooking chamber 10 and a component chamber 11 inside the housing 2. The component chamber 11 is located below the cooking chamber 10. The cooking chamber 10 receives a food to be heated. The component chamber 11 accommodates heat-generating components 12. The heat-generating components 12 are components that generate heat while operating on power being supplied.

The metal plate member 100 is located inside the housing 2. The metal plate member 100 defines the cooking chamber 10 and the component chamber 11. The metal plate member 100 includes a bottom plate 101, a front plate 102, and a rear plate 103.

The front plate 102 has an opening 13. The door 3 covers and uncovers the opening 13 in a front portion of the housing 2. The opening 13 communicates with the cooking chamber 10. The user can place and remove a food into and from the cooking chamber 10 through the opening 13.

Figure 4:
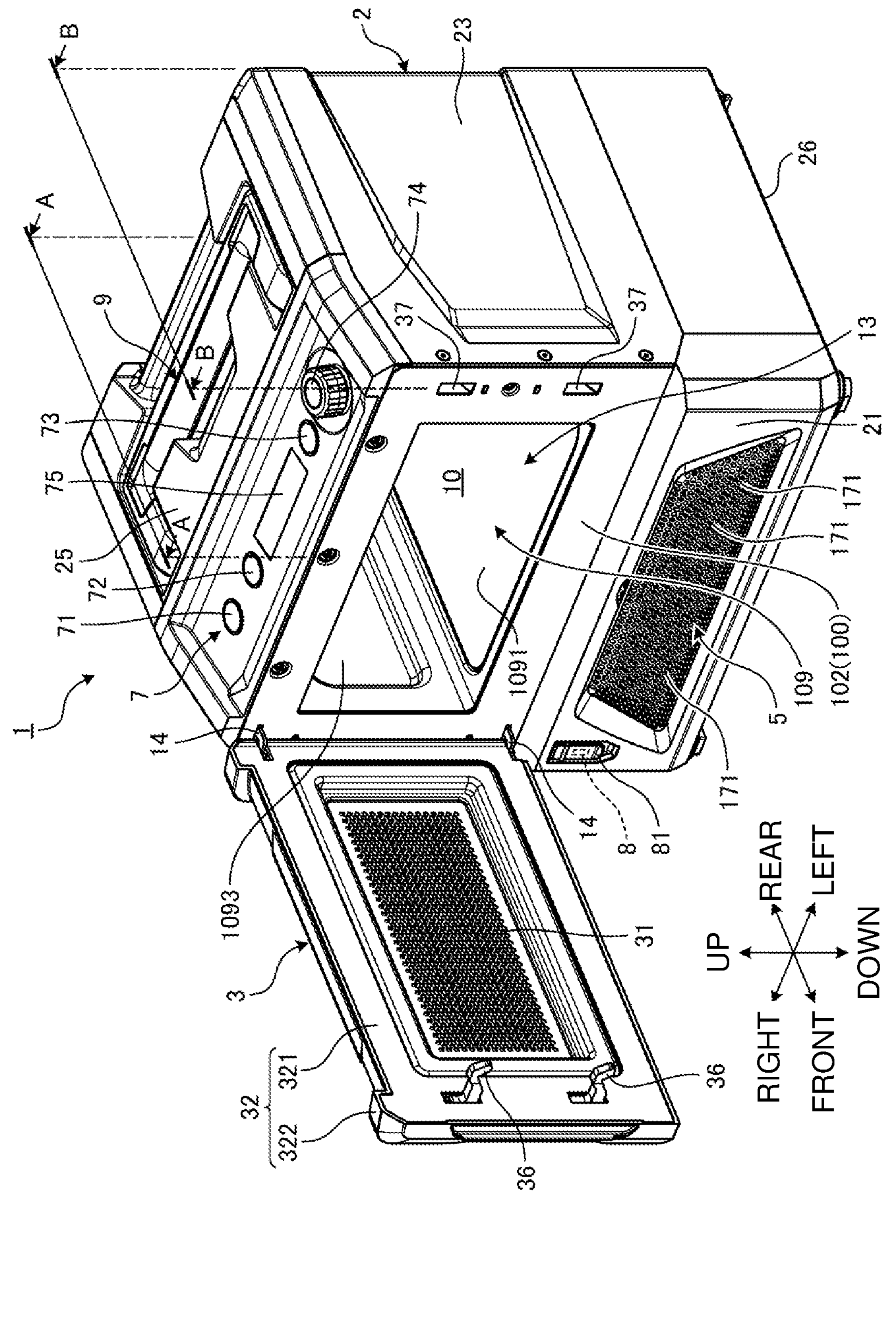
FIG. 4 is a perspective view of the microwave oven according to the embodiment with a door open as viewed from the left front.

FIG. 4 is a perspective view of the microwave oven 1 according to the embodiment with the door 3 open as viewed from the left front. As shown in FIG. 4, the door 3 is joined to the front plate 102 with hinges 14. The hinges 14 are located at the right end of the front plate 102. The door 3 has its right end joined to the right end of the front plate 102 with the hinges 14. The hinges 14 have the hinge axes extending in the vertical direction. The door 3 is a side-swing door. This structure allows the user to smoothly open the door 3 of the microwave oven 1 placed in a small space.

The door 3 includes a plate 31 and a frame 32. The frame 32 surrounds the plate 31.

The plate 31 is fixed to the frame 32. The plate 31 is formed from tempered glass. When the door 3 is closed, the user can view the inside of the cooking chamber 10 through the plate 31.

The frame 32 has its right end joined to the front plate 102 with the hinges 14.

Latches 36 are located at the left end of the frame 32. The front plate 102 has openings 37 at the left end. The latches 36 are engaged in the openings 37 to allow the door 3 to remain closed.

The frame 32 includes a base frame 321 and a cover frame 322. The cover frame 322 covers the front of the base frame 321. The base frame 321 is at least partially formed from metal. The cover frame 322 is formed from a synthetic resin. The cover frame 322 in the embodiment is formed from an acrylonitrile-butadiene-styrene (ABS) resin. The cover frame 322 has its front end located frontward from the front surface of the plate 31. The cover frame 322 thus protects the plate 31. The cover frame 322 may hit an object while the microwave oven 1 is being carried. However, the plate 31 is less likely to be hit by the object.

The battery mounts 4 are located at rear portions of the housing 2. The battery mounts 4 in the embodiment include a first battery mount 41 and a second battery mount 42. The first battery mount 41 is located on the rear surface 22 of the housing 2. The second battery mount 42 is located on the rear surface 22 of the housing 2 and adjacent to the first battery mount 41. The first battery mount 41 and the second battery mount 42 are arranged at a distance from each other in a lateral direction. The first battery mount 41 is located leftward from the second battery mount 42.

The first battery mount 41 and the second battery mount 42 have the same structure. The first battery mount 41 and the second battery mount 42 have the same outer dimensions. The first battery mount 41 and the second battery mount 42 each have a pair of guide rails 43 and terminals 44. The terminals 44 are located between the pair of guide rails 43. The guide rails 43 extend in the vertical direction. The pair of the guide rails 43 are arranged at a distance from each other in the lateral direction. The first battery mount 41 and the second battery mount 42 each have multiple terminals 44.

In the lateral direction, the distance between the center of the rear surface 22 and the first battery mount 41 is the same as the distance between the center of the rear surface 22 and the second battery mount 42. The first battery mount 41 and the second battery mount 42 are vertically aligned with each other.

Figure 5:
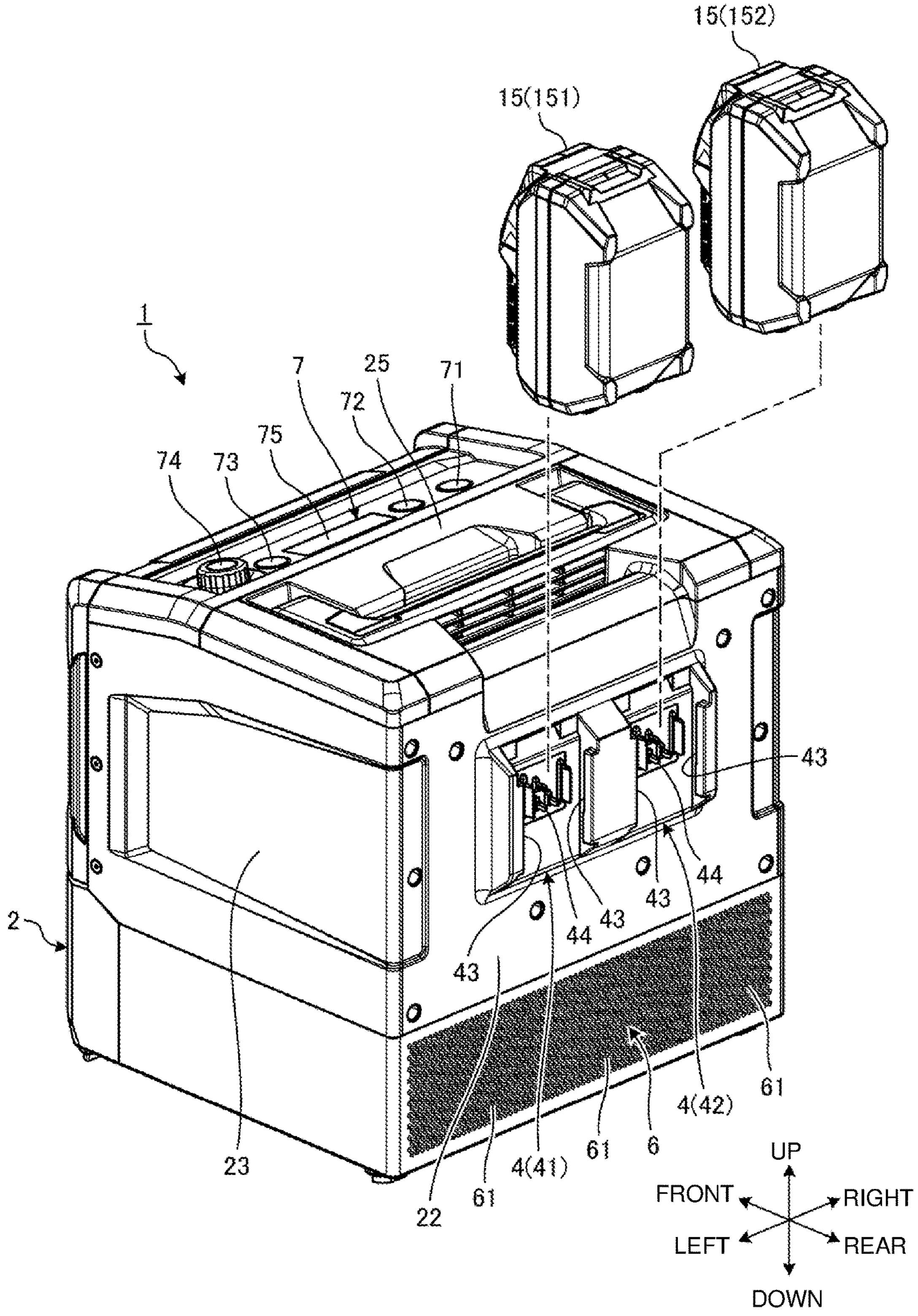
FIG. 5 is a perspective view of battery mounts and battery packs in the embodiment as viewed from the left rear.

FIG. 5 is a perspective view of the battery mounts 4 and battery packs 15 in the embodiment as viewed from the left rear. The battery packs 15 are attached to and detached from the battery mounts 4. The battery packs 15 power electronic devices (loads) incorporated in the microwave oven 1. The electronic devices include the heat-generating components 12. The battery packs 15 are general-purpose batteries for powering various electrical devices. The battery packs 15 are usable for powering power tools. The battery packs 15 are usable for powering electrical devices other than power tools. The battery packs 15 each include a lithium-ion battery. The battery packs 15 are rechargeable. The battery mounts 4 have the same structure as a battery mount included in a power tool.

The battery packs 15 include a first battery pack 151 and a second battery pack 152. The first battery pack 151 is attached to the first battery mount 41. The second battery pack 152 is attached to the second battery mount 42.

The first battery pack 151 and the second battery pack 152 have the same outer shape. The first battery pack 151 and the second battery pack 152 have the same outer dimensions. The first battery pack 151 and the second battery pack 152 have the same weight. The first battery pack 151 and the second battery pack 152 have the same capacity. In other words, the first battery pack 151 and the second battery pack 152 are the battery packs 15 of the same type.

The first battery mount 41 and the second battery mount 42 are arranged symmetrically to each other in the lateral direction. The first battery pack 151 and the second battery pack 152 are the battery packs 15 of the same type. Thus, with the first battery pack 151 attached to the first battery mount 41 and the second battery pack 152 attached to the second battery mount 42, the microwave oven 1 has a well-balanced weight in the lateral direction. The user can thus carry the microwave oven 1 smoothly.

The user can attach the battery packs 15 to the battery mounts 4. The user can detach the battery packs 15 from the battery mounts 4. The user places the battery packs 15 onto the battery mounts 4 from above and moves the battery packs 15 downward to attach the battery packs 15 to the battery mounts 4. In other words, the battery packs 15 are placed onto the battery mounts 4 from above and attached to the battery mounts 4.

The guide rails 43 guide the battery pack 15 vertically. The battery pack 15 is placed onto the battery mount 4 while being guided by the guide rails 43. This connects terminals on the battery pack 15 and the terminals 44 on the battery mount 4.

The terminals on the battery pack 15 include a power terminal and a signal terminal. The terminals 44 on the battery mount 4 include a power terminal and a signal terminal. The power terminal on the battery pack 15 is connected to the power terminal on the battery mount 4 to supply power from the battery pack 15 to battery mount 4. The signal terminal on the battery pack 15 is connected to the signal terminal on the battery mount 4 to allow transmission and reception of control signals between the battery pack 15 and the battery mount 4. The user moves the battery packs 15 upward to detach the battery packs 15 from the battery mounts 4.

At a work site, the microwave oven 1 may be placed on a floor surface or on the ground when used. For the microwave oven 1 placed on a floor surface or on the ground, the user can smoothly place the battery packs 15 onto the battery mounts 4 from above.

Figure 6:
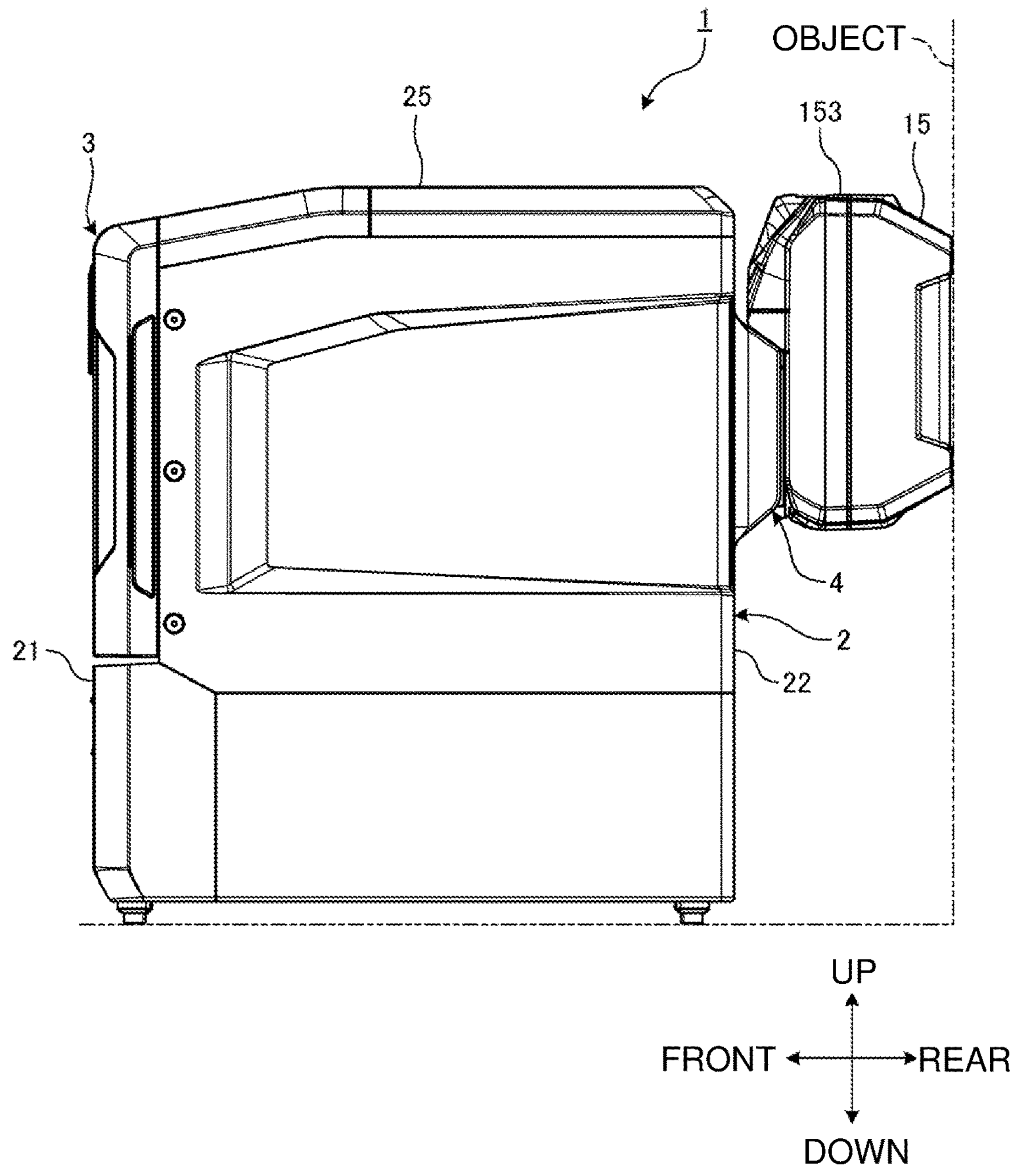
FIG. 6 is a side view of the microwave oven with the battery packs in the embodiment attached.

FIG. 6 is a side view of the microwave oven 1 according to the embodiment with the battery packs 15 attached. As shown in FIG. 6, with the battery packs 15 attached to the battery mounts 4, the upper surface 25 of the housing 2 is located above upper surfaces 153 of the battery packs 15. With the battery packs 15 not protruding upward from the upper surface 25 of the housing 2, the microwave oven 1 avoids being upsized in the vertical direction. Additionally, the user can place an object on the upper surface 25 of the housing 2.

As shown in FIGS. 1, 3, and 4, the housing 2 has the inlets 5 in its front portion. The inlets 5 communicate with the component chamber 11. Air to be drawn into the component chamber 11 flows through the inlets 5. The inlets 5 are located in the front portion of the housing 2 and below the opening 13.

Figure 7:
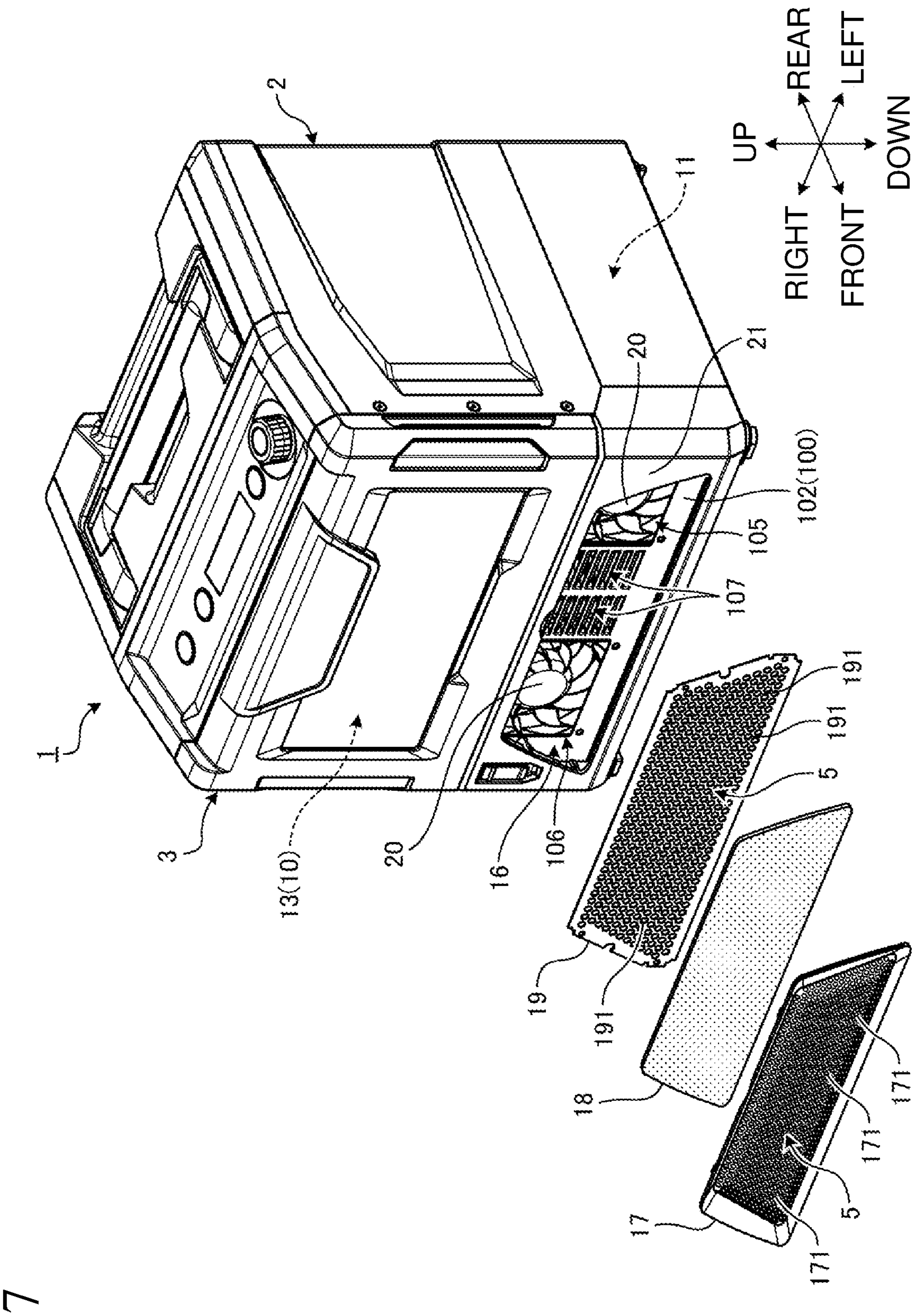
FIG. 7 is an exploded perspective view of the microwave oven according to the embodiment as viewed from the left front.

FIG. 7 is an exploded perspective view of the microwave oven 1 according to the embodiment as viewed from the left front. The housing 2 has an opening 16 in its front portion. The opening 16 is located below the opening 13. The opening 16 is elongated in the lateral direction. The opening 16 is substantially trapezoidal. The opening 16 communicates with the component chamber 11.

The opening 16 receives a cover plate 17, a filter 18, and a mesh plate 19. The cover plate 17 and the mesh plate 19 are formed from metal. The cover plate 17 and the mesh plate 19 are formed from metal such as iron or stainless steel. The filter 18 is a porous member formed from a polyurethane resin or a nylon resin.

The cover plate 17 is removably received in the opening 16. The filter 18 is removably received in the opening 16. The cover plate 17 and the filter 18 are replaceable. The mesh plate 19 may also be replaceable.

The cover plate 17 is located in front of the filter 18. The filter 18 is located in front of the mesh plate 19. The filter 18 is located between the cover plate 17 and the mesh plate 19. The filter 18 has its front surface facing the rear surface of the cover plate 17. The filter 18 has its rear surface facing the front surface of the mesh plate 19.

The cover plate 17 has through-holes 171. The through-holes 171 connect the front and rear surfaces of the cover plate 17. The cover plate 17 has multiple through-holes 171 at intervals in the lateral and vertical directions.

The mesh plate 19 has through-holes 191. The through-holes 191 connect the front and rear surfaces of the mesh plate 19. The mesh plate 19 has multiple through-holes 191 at intervals in the lateral and vertical directions.

The inlets 5 include the through-holes 171. The inlets 5 include the through-holes 191. The filter 18 is located inward from the through-holes 171 in the housing 2. The filter 18 faces the through-holes 171 (inlets 5).

The component chamber 11 accommodates fans 20. The fans 20 face the opening 16. The fans 20 are located behind the mesh plate 19. The component chamber 11 accommodates two fans 20. The two fans 20 are arranged at a distance from each other in the lateral direction.

The inlets 5 are small. Thus, less external foreign matter enters the component chamber 11 of the housing 2 through the inlets 5.

As shown in FIGS. 2, 3, and 5, the housing 2 has the outlets 6 in its rear portion. The outlets 6 communicate with the component chamber 11. Air to be discharged from the component chamber 11 flows through the outlets 6. The outlets 6 are located in the rear portion of the housing 2 and below the battery mounts 4. The outlets 6 in the embodiment include multiple through-holes 61 in the rear portion of the housing 2. The through-holes 61 connect the component chamber 11 to the outside of the housing 2. The housing 2 has the multiple through-holes 61 at intervals in the lateral and vertical directions.

The outlets 6 are small. Thus, less external foreign matter enters the component chamber 11 of the housing 2 through the outlets 6.

As the fans 20 rotate, air outside the housing 2 flows into the component chamber 11 through the through-holes 171 in the cover plate 17, the filter 18, and the through-holes 191 in the mesh plate 19. The filter 18 collects foreign matter from air drawn in through the through-holes 171 (inlets 5).

Air in the component chamber 11 flows out of the housing 2 through the outlets 6. The component chamber 11 accommodates the heat-generating components 12. Air flowing through the component chamber 11 cools the heat-generating components 12. This reduces excessive increase in the temperature of the heat-generating components 12.

When the microwave oven 1 is used at a work site or outdoors, the filter 18 reduces entry of foreign matter into the component chamber 11. The cover plate 17 and the filter 18 are removably received in the opening 16. Thus, when the filter 18 becomes soiled, the user can easily replace or clean the filter 18.

With the battery packs 15 attached to the battery mounts 4, the outlets 6 are less likely to be at a short distance from an object that may be located behind the microwave oven 1 as shown in FIG. 6. Air in the component chamber 11 is thus smoothly discharged through the outlets 6. Air discharged through the outlets 6 has high temperature. The outlets 6 are less likely to be at a shorter distance from an object. The object is thus less likely to be heated to high temperature.

The battery mounts 4 are located behind the cooking chamber 10. The battery mounts 4 and the component chamber 11 are located away from each other. This reduces transfer of heat from the heat-generating components 12 in the component chamber 11 to the battery packs 15 attached to the battery mounts 4. This reduces degradation of the battery packs 15.

The battery mounts 4 are located above the outlets 6. In other words, the battery mounts 4 are located in an upper portion of the rear surface 22. Thus, when the microwave oven 1 is placed on a floor surface or on the ground, the user can smoothly attach and detach the battery packs 15 to and from the battery mounts 4.

The interface 7 functions as a user interface to allow data communication between the user and the microwave oven 1. The interface 7 is located in a front portion of the housing 2 and above the opening 13. The interface 7 includes a power button 71, an output switch button 72, a stop button 73, a setting dial 74, and a display 75.

The power button 71 is depressed to activate the microwave oven 1. The output switch button 72 is depressed to switch the power output of the microwave oven 1 between, for example, 500 W and 350 W. The stop button 73 is depressed to stop the operation of the microwave oven 1. The setting dial 74 is turned to set the heating time for a food placed in the cooking chamber 10. The setting dial 74 functions also as a start button. The setting dial 74 is depressed to start the heating of a food placed in the cooking chamber 10.

The display 75 displays information including the power output set with the output switch button 72, the heating time set with the setting dial 74, the remaining heating time, and the remaining battery level. The display 75 is, for example, a liquid crystal display or an organic electroluminescence (EL) display.

The interface 7 is located in the front portion of the housing 2 and above the opening 13. Thus, when the microwave oven 1 is placed on a floor surface or on the ground, the user can smoothly operate the power button 71, the output switch button 72, the stop button 73, and the setting dial 74 and easily view the display 75.

The output terminal 8 is located in a front portion of the housing 2 and below the hinges 14. The output terminal 8 includes a universal serial bus (USB) terminal. The output terminal 8 is covered with a terminal cover 81. The terminal cover 81 is formed from rubber. The terminal cover 81 protects the output terminal 8. The terminal cover 81 has its upper end connected to the housing 2. The output terminal 8 outputs power from the battery packs 15.

The user can connect an electronic device such as a mobile terminal to the output terminal 8. To connect an electronic device to the output terminal 8, the user lifts the terminal cover 81 to expose the output terminal 8. The user can charge a secondary battery included in an electronic device by connecting the electronic device to the output terminal 8.

The output terminal 8 is located in the front portion of the housing 2. This structure allows the user to smoothly connect an electronic device to the output terminal 8. The output terminal 8 is located in the front portion of the housing 2 and below the hinges 14. Thus, the output terminal 8 is less likely to be in contact with any food accidentally spilled by the user when the user places or removes the food into or from the cooking chamber 10 through the opening 13.

Figure 8:
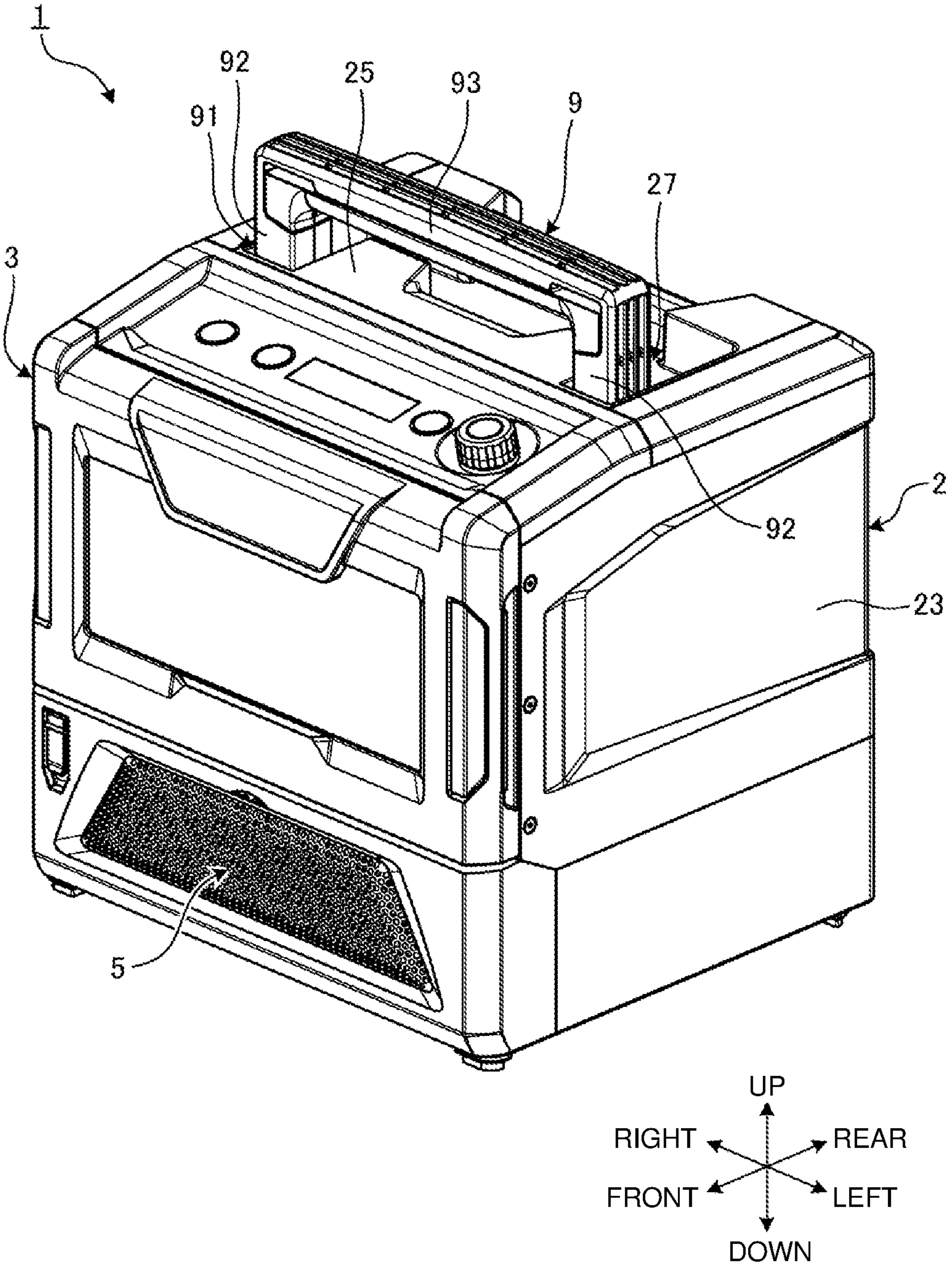
FIG. 8 is a perspective view of the microwave oven according to the embodiment as viewed from the left front.

FIG. 8 is a perspective view of the microwave oven 1 according to the embodiment as viewed from the left front. The handle 9 is joined to an upper portion of the housing 2 with hinges 91. The hinges 91 have the hinge axes extending in the lateral direction. The handle 9 includes two arms 92 and a grip 93. The two arms 92 are joined to the housing 2 with the hinges 91. The grip 93 connects the two arms 92.

As shown in FIG. 8, the handle 9 can pivot to have the grip 93 being away from the housing 2. Thus, the user can grip the grip 93 with a hand to carry the microwave oven 1.

The handle 9 is joined to a center portion of the housing 2 in the front-rear direction. The hinges 91 have the hinge axes extending in the lateral direction. Thus, the user can grip the handle 9 and smoothly carry the microwave oven 1 with the battery packs 15 attached to the battery mounts 4. More specifically, with the battery packs 15 attached to the battery mounts 4, the microwave oven 1 may have an imbalanced weight in the front-rear direction. The hinges 91 for the handle 9 have the hinge axes extending in the lateral direction. The user can thus grip the handle 9 and smoothly carry the microwave oven 1 despite any imbalanced weight in the front-rear direction.

The housing 2 has a recess 27 in the upper portion. As shown in FIG. 1, the handle 9 can pivot to have the arms 92 and the grip 93 being received in the recess 27. The handle 9 received in the recess 27 is located downward from the upper surface 25 of the housing 2. The microwave oven 1 thus avoids being upsized in the vertical direction. Additionally, the user can place an object on the upper surface 25.

The handle 9 is located in the upper portion of the housing 2. The heat-generating components 12 are located in a lower portion of the housing 2. Heat is less likely to be transferred from the heat-generating components 12 to the handle 9. In other words, the handle 9 is less likely to be heated.

Figure 9:
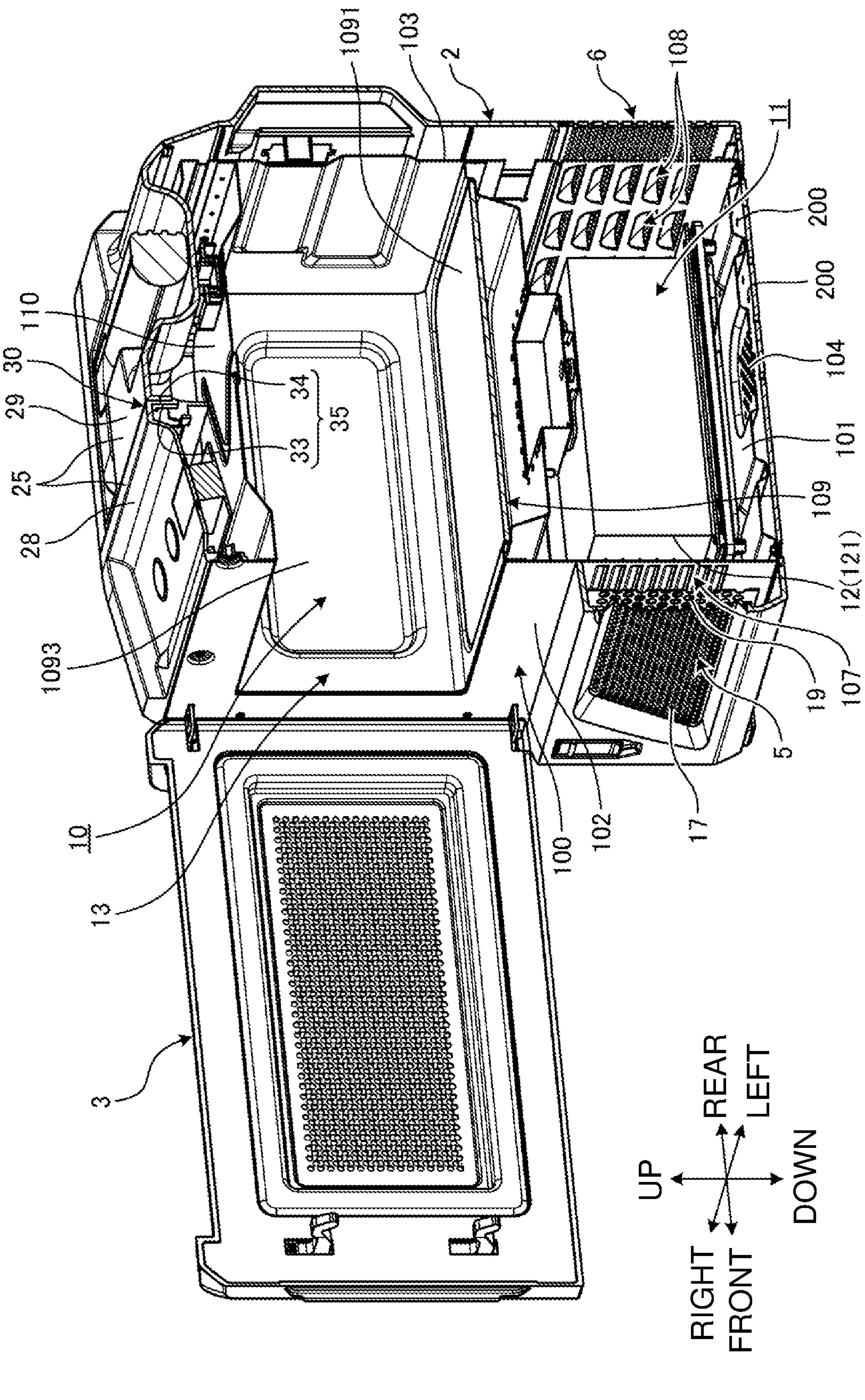
FIG. 9 is a cross-sectional perspective view of the microwave oven according to the embodiment.
Figure 10:
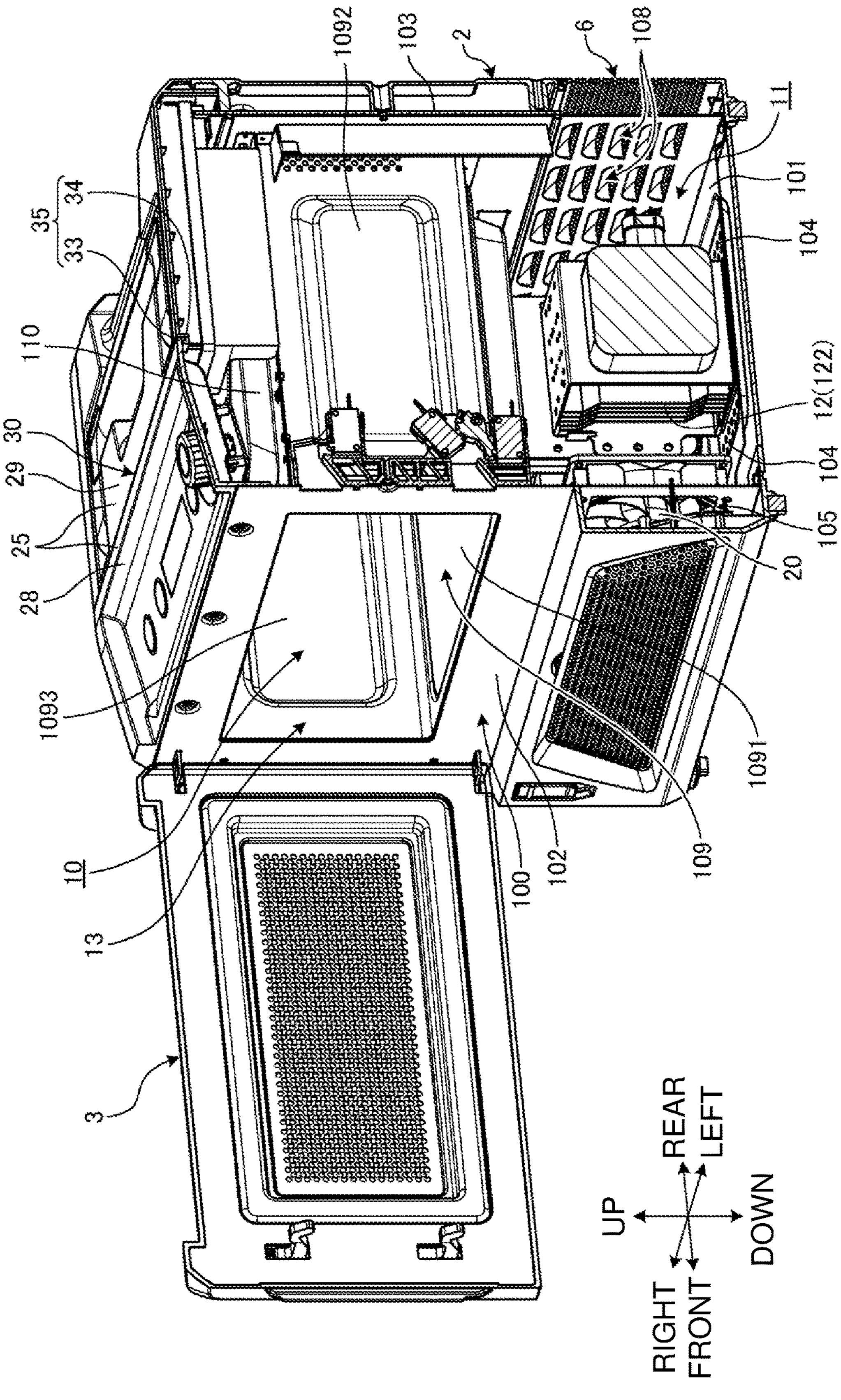
FIG. 10 is a cross-sectional perspective view of the microwave oven according to the embodiment.

FIGS. 9 and 10 each are a cross-sectional perspective view of the microwave oven 1 according to the embodiment. FIG. 9 is a cross-sectional view taken along line A-A in FIG. 4 as viewed in the direction indicated by arrows. FIG. 10 is a cross-sectional view taken along line B-B in FIG. 4 as viewed in the direction indicated by arrows.

The housing 2 includes multiple enclosure members. The housing 2 includes at least a first enclosure member 28 and a second enclosure member 29. In the example shown in FIGS. 9 and 10, the first enclosure member 28 is located frontward from the second enclosure member 29. The first enclosure member 28 is adjacent to the second enclosure member 29. The first enclosure member 28 includes a front portion of the upper surface 25 of the housing 2. The second enclosure member 29 includes a rear portion of the upper surface 25 of the housing 2.

The housing 2 includes a seal 30. The seal 30 is located at the boundary between the first enclosure member 28 and the second enclosure member 29. The seal 30 includes a labyrinth seal 35. The labyrinth seal 35 includes a first bend 33 and a second bend 34. The first bend 33 is located at the rear end of the first enclosure member 28. The second bend 34 is located at the front end of the second enclosure member 29.

The seal 30 reduces entry of external foreign matter into the housing 2. The foreign matter includes liquids (water). The housing 2 with the seal 30 is watertight. When the microwave oven 1 is used at a work site or outdoors, the seal 30 reduces entry of foreign matter into the housing 2.

The microwave oven 1 includes the metal plate member 100 located inside the housing 2. The metal plate member 100 is formed from iron. The metal plate member 100 may be formed from stainless steel. The metal plate member 100 defines the cooking chamber 10 and the component chamber 11. The heat-generating components 12 are supported by the metal plate member 100.

Figure 11:
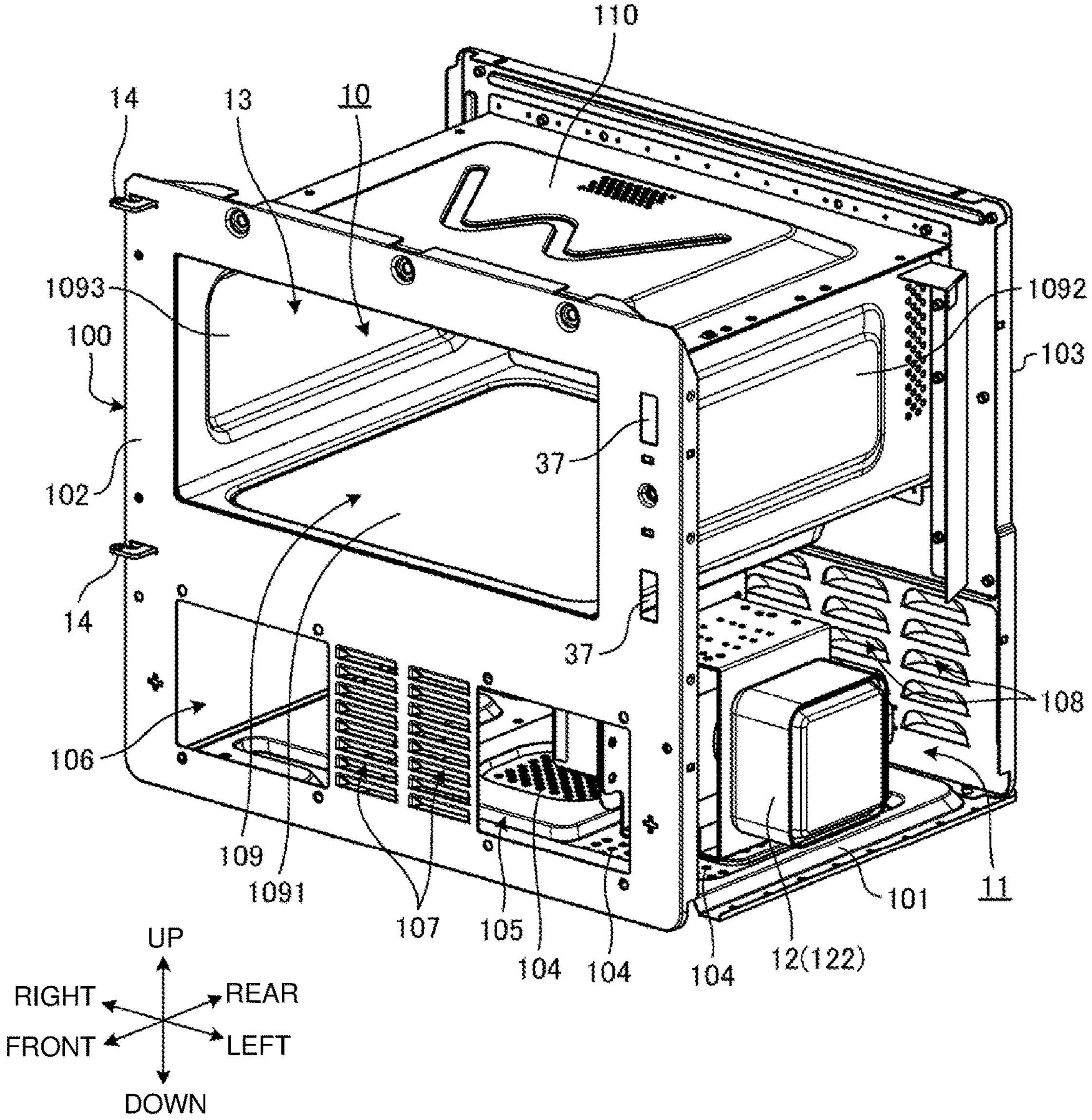
FIG. 11 is a perspective view of a metal plate member in the embodiment as viewed from the left front.

FIG. 11 is a perspective view of the metal plate member 100 in the embodiment as viewed from the left front. As shown in FIGS. 9 to 11, the metal plate member 100 includes the bottom plate 101, the front plate 102, and the rear plate 103. The front plate 102 is connected to the front of the bottom plate 101. The rear plate 103 is connected to the rear of the bottom plate 101. The bottom plate 101 has its front end fastened to the lower end of the front plate 102. The bottom plate 101 has its rear end fastened to the lower end of the rear plate 103.

The front plate 102 and the rear plate 103 are connected to each other with the bottom plate 101 in between. In this structure, the strength of the metal plate member 100 is less likely to decrease. The strength of the microwave oven 1 is thus less likely to decrease. While being carried, the microwave oven 1 may be under vibrations or an impact. Having the strength less likely to decrease, the microwave oven 1 is less likely to be degraded.

The heat-generating components 12 are supported on the bottom plate 101. The heat-generating components 12 include at least a controller 121 and a magnetron 122. The controller 121 is located rightward from the magnetron 122.

Heat from the heat-generating components 12 is transferred to the bottom plate 101. The bottom plate 101 dissipates heat from the heat-generating components 12. Additionally, the bottom plate 101 reduces transfer of heat from the heat-generating components 12 to the bottom of the housing 2. When the microwave oven 1 is placed on a predetermined placement surface, the bottom plate 101 reduces direct transfer of heat from the heat-generating components 12 to the placement surface. The bottom plate 101 serves as a heat-dissipating member that dissipates heat from the heat-generating components 12. The bottom plate 101 serves as a heat shield that reduces transfer of heat from the heat-generating components 12 to the placement surface.

The bottom plate 101 has multiple through-holes 104. Any foreign matter in the component chamber 11 is discharged from the component chamber 11 through the through-holes 104. The bottom of the housing 2 is located below the bottom plate 101. The housing 2 has through-holes 200 in the bottom. Foreign matter discharged from the component chamber 11 through the through-holes 104 is discharged from the housing 2 through the through-holes 200 in the bottom of the housing 2. The foreign matter includes liquids (water). The through-holes 104 and 200 serve as drain holes.

The front plate 102 has the opening 13, an air vent 105, an air vent 106, and air vents 107.

The opening 13 is located in an upper portion of the front plate 102.

The air vent 105 is located in a lower left portion of the front plate 102. The air vent 106 is located in a lower right portion of the front plate 102. As shown in FIG. 7, the air vent 105 and the air vent 106 each receive the fan 20. The air vent 105 and the air vent 106 face the inlets 5. At least part of air to be drawn into the component chamber 11 flows through the inlets 5 and then the air vent 105 and the air vent 106 to flow into the component chamber 11.

The air vents 107 are located between the air vent 105 and the air vent 106 in the lateral direction. The front plate 102 has multiple air vents 107. Each air vent 107 is smaller than the air vent 105 and the air vent 106. The air vents 107 face the inlets 5. At least part of air to be drawn into the component chamber 11 flows through the inlets 5 and then the air vents 107 to flow into the component chamber 11.

The rear plate 103 has multiple air vents 108. The air vents 108 face the outlets 6. At least part of air to be discharged from the component chamber 11 flows through the air vents 108 and then the outlets 6 to be discharged from the component chamber 11.

A partition 109 is located between an upper portion of the front plate 102 and an upper portion of the rear plate 103. The partition 109 includes a bottom plate 1091, a left plate 1092, and a right plate 1093. The front plate 102 is connected to the front end of the partition 109. The rear plate 103 is connected to the rear end of the partition 109. A ceiling plate 110 is connected to the upper end of the partition 109. The partition 109, the upper portion of the front plate 102, the upper portion of the rear plate 103, and the ceiling plate 110 define the cooking chamber 10. The component chamber 11 is located below the bottom plate 1091. The bottom plate 1091 separates the cooking chamber 10 from the component chamber 11. The bottom plate 101, a lower portion of the front plate 102, a lower portion of the rear plate 103, and the bottom plate 1091 in the partition 109 define the component chamber 11.

The controller 121 includes a processor such as a central processing unit (CPU), and a memory such as a read-only memory (ROM) or a random-access memory (RAM). The controller 121 includes a power circuit to power the electronic devices incorporated in the microwave oven 1. The controller 121 controls the electronic devices incorporated in the microwave oven 1 in response to an operation signal output from the interface 7.

The magnetron 122 generates electromagnetic waves with power supplied from the battery packs 15. The electromagnetic waves output from the magnetron 122 heat a food in the cooking chamber 10.

Figure 12:
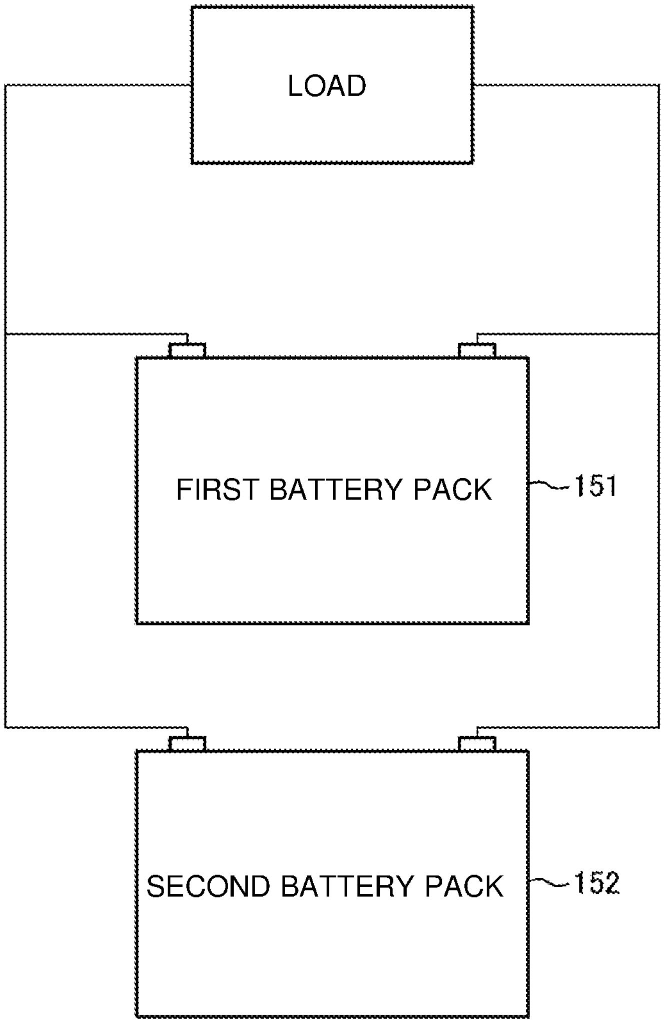
FIG. 12 is a schematic diagram of a first battery pack and a second battery pack in the embodiment.

FIG. 12 is a schematic diagram of the first battery pack 151 and the second battery pack 152 in the embodiment. The battery packs 15 power the electronic devices (loads) incorporated in the microwave oven 1. The electronic devices include at least the controller 121 and the magnetron 122.

As shown in FIG. 12, the first battery pack 151 and the second battery pack 152 are connected parallel to each other. The microwave oven 1 is thus operable for a longer period. The microwave oven 1 is also operable with the battery pack 15 attached to either the first battery mount 41 or the second battery mount 42 in the battery mounts 4.

Operation

Figure 13:
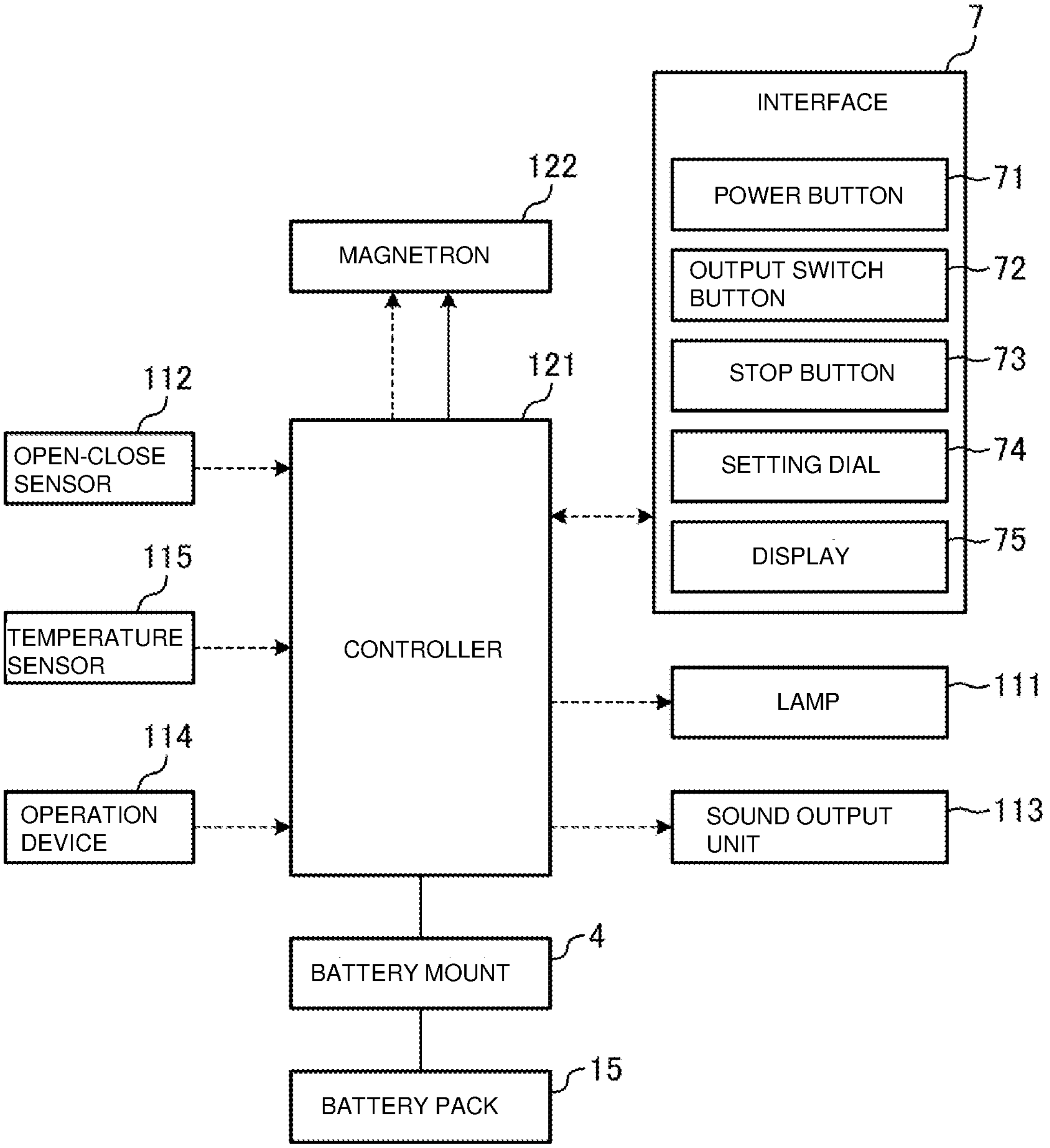
FIG. 13 is a block diagram of the microwave oven according to the embodiment.

FIG. 13 is a block diagram of the microwave oven 1 according to the embodiment. The operation of the microwave oven 1 will be described with reference to FIG. 13.

As shown in FIG. 13, the microwave oven 1 includes the controller 121, the magnetron 122, the interface 7, a lamp 111, an open-close sensor 112, a sound output unit 113, an operation device 114, and a temperature sensor 115. The lamp 111 can illuminate the inside of the cooking chamber 10. The open-close sensor 112 detects the open or closed state of the door 3. The operation device 114 operates the sound output unit 113. The temperature sensor 115 detects the temperature of the component chamber 11.

The power button 71 in the interface 7 is depressed with the battery packs 15 attached to the battery mounts 4 to activate the microwave oven 1. The user opens the door 3 and places a food into the cooking chamber 10. The open-close sensor 112 transmits, to the controller 121, a detection signal indicating the door 3 being open. The controller 121 turns on the lamp 111 in response to the detection signal from the open-close sensor 112.

After placing the food into the cooking chamber 10, the user closes the door 3. The open-close sensor 112 transmits, to the controller 121, a detection signal indicating the door 3 being closed. The controller 121 turns off the lamp 111 in response to the detection signal from the open-close sensor 112. In other words, in response to the door 3 being open, the lamp 111 is turned on to illuminate the inside of the cooking chamber 10. The lamp 111 is turned off in response to the door 3 being closed.

The user turns the setting dial 74 to set the heating time for a food. The controller 121 causes the display 75 to display the set heating time. The user turns the setting dial 74 while viewing the heating time appearing on the display 75. After setting the heating time, the user depresses the setting dial 74. This causes the controller 121 to activate the magnetron 122. The magnetron 122 then outputs electromagnetic waves to start heating the food. The controller 121 then turns on the lamp 111.

The controller 121 stops the operation of the magnetron 122 at a time point at which the set heating time elapses. This ends the heating of the food. The controller 121 turns off the lamp 111 at the time point at which the set heating time elapses. The controller 121 causes the sound output unit 113 to output a sound at the time point at which the set heating time elapses. This allows the user to notice that the heating of the food is complete. The user opens the door 3 and removes the heated food from the cooking chamber 10.

The controller 121 causes the sound output unit 113 to output a sound when determining, based on the detection signal from the open-close sensor 112, that the door 3 remains closed for a period longer than a predetermined time after the heating of a food. This allows the user to notice that the food is left unremoved from the cooking chamber 10.

The user operates the operation device 114 to adjust the volume of the sound output from the sound output unit 113. When the microwave oven 1 is placed at a noisy place, the user may operate the operation device 114 to increase the volume of the sound output from the sound output unit 113. This allows the user at a noisy place to notice that the heating of the food is complete or the food is left unremoved from the cooking chamber 10. When the microwave oven 1 is placed at a less noisy place, the user may operate the operation device 114 to reduce the volume of the sound output from the sound output unit 113.

The controller 121 stops the operation of the magnetron 122 in response to a detection signal from the temperature sensor 115. For example, the filter 18 may have a large amount of foreign matter on it, thus preventing air outside the housing 2 from smoothly flowing into the component chamber 11. This may increase the temperature inside the component chamber 11 excessively. The controller 121 stops the operation of the magnetron 122 when determining, based on the detection signal from the temperature sensor 115, that the temperature inside the component chamber 11 exceeds a predetermined threshold temperature.

As described above, the battery mounts 4 in the embodiment are located at the rear portion of the housing 2. This reduces the likelihood of the microwave oven 1 being upsized. This reduces the likelihood of the microwave oven 1 being upsized at least in the lateral direction. The microwave oven 1 without the battery packs 15 attached to the battery mounts 4 can be stored in a small space.

The battery mounts 4 and the outlets 6 are located in the rear portions of the housing 2. With the battery packs 15 attached to the battery mounts 4 as described with reference to FIG. 6, the outlets 6 are less likely to be at a short distance from an object behind the microwave oven 1. Air in the component chamber 11 is thus smoothly discharged through the outlets 6. Air discharged through the outlets 6 has high temperature. The outlets 6 are less likely to be at a shorter distance from an object. The object is thus less likely to be heated to high temperature.

The outlets 6 are located in the rear portion of the housing 2 and below the battery mounts 4. In other words, the battery mounts 4 are located behind the cooking chamber 10 and above the outlets 6. The battery mounts 4 are located away from the component chamber 11. This reduces transfer of heat from the heat-generating components 12 in the component chamber 11 to the battery packs 15 attached to the battery mounts 4. This reduces degradation of the battery packs 15.

The battery mounts 4 are located in the upper portion of the rear surface 22. Thus, when the microwave oven 1 is placed on a floor surface or on the ground, the user can smoothly attach and detach the battery packs 15 to and from the battery mounts 4.

The housing 2 has the inlets 5 in its front portion. Thus, air outside the housing 2 flows into the component chamber 11 through the inlets 5. The component chamber 11 accommodates the heat-generating components 12. Air flowing through the component chamber 11 cools the heat-generating components 12. This reduces excessive increase in the temperature of the heat-generating components 12. The outlets 6 are located in the rear portion of the housing 2. This structure allows air to smoothly flow through the component chamber 11 from the front to the rear of the housing 2.

The inlets 5 are located in the front portion of the housing 2 and below the opening 13. The inlets 5 and the outlets 6 are thus substantially aligned with each other in the vertical direction. This structure allows air flowing into the component chamber 11 through the inlets 5 to flow through the component chamber 11 from the front to the rear of the housing 2 and be discharged smoothly through the outlets 6.

The cover plate 17 is received in the opening 16 communicating with the component chamber 11. The cover plate 17 has the through-holes 171 serving as the inlets 5. The inlets 5 are small. Thus, less external foreign matter enters the component chamber 11 of the housing 2 through the inlets 5. The cover plate 17 is removably received in the opening 16. The cover plate 17 is thus easily replaceable.

The filter 18 can collect foreign matter from air drawn in through the inlets 5 (through-holes 171). When the microwave oven 1 is used at a work site or outdoors, the filter 18 reduces entry of foreign matter into the component chamber 11. The cover plate 17 and the filter 18 are removably received in the opening 16. For the filter 18 being soiled, the user can easily replace or clean the filter 18.

The filter 18 faces the inlets 5 (through-holes 171). The filter 18 can thus efficiently collect foreign matter from air drawn in through the inlets 5 (through-holes 171).

The component chamber 11 is located below the cooking chamber 10. The upper part of the microwave oven 1 is thus less likely to be heated.

The metal plate member 100 is located inside the housing 2. The heat-generating components 12 are supported by the metal plate member 100. The metal plate member 100 reduces the decrease in the strength of the microwave oven 1. While being carried, the microwave oven 1 may be under vibrations or an impact. Having the strength less likely to decrease, the microwave oven 1 is less likely to be degraded. The metal plate member 100 includes the bottom plate 101, the front plate 102, and the rear plate 103. The front plate 102 and the rear plate 103 are connected to each other with the bottom plate 101 in between. The bottom plate 101 effectively reduces the decrease in the strength of the metal plate member 100.

The heat-generating components 12 are supported on the bottom plate 101. Heat from the heat-generating components 12 is thus transferred to the bottom plate 101. The bottom plate 101 dissipates heat from the heat-generating components 12. Additionally, the bottom plate 101 reduces transfer of heat from the heat-generating components 12 to the bottom of the housing 2. When the microwave oven 1 is placed on a predetermined placement surface, the bottom plate 101 reduces direct transfer of heat from the heat-generating components 12 to the placement surface. The bottom plate 101 serves as a heat-dissipating member that dissipates heat from the heat-generating components 12. The bottom plate 101 serves as a heat shield that reduces transfer of heat from the heat-generating components 12 to the placement surface.

The front plate 102 has the air vent 105, the air vent 106, and the air vents 107. The rear plate 103 has the air vents 108. Thus, at least part of air to be drawn into the component chamber 11 flows through the inlets 5 and then the air vent 105, the air vent 106, and the air vents 107 to flow into the component chamber 11. At least part of air to be discharged from the component chamber 11 flows through the air vents 108 and then the outlets 6 to be discharged from the component chamber 11.

The door 3 is joined to the metal plate member 100 with the hinges 14. The hinges 14 have the hinge axes extending in the vertical direction. The door 3 is a side-swing door. This structure allows the user to smoothly open the door 3 of the microwave oven 1 placed in a small space.

The output terminal 8 is located in the front portion of the housing 2. This structure allows the user to smoothly connect an electronic device such as a mobile terminal to the output terminal 8. The output terminal 8 is located in the front portion of the housing 2 and below the hinges 14. Thus, the output terminal 8 is less likely to be in contact with any food accidentally spilled by the user when the user places or removes the food into or from the cooking chamber 10 through the opening 13.

The output terminal 8 outputs power from the battery packs 15. The user can thus connect an electronic device to the output terminal 8 to charge the secondary battery included in the electronic device.

The housing 2 includes the first enclosure member 28 and the second enclosure member 29. The seal 30 is located at the boundary between the first enclosure member 28 and the second enclosure member 29. The seal 30 reduces entry of external foreign matter into the housing 2. The foreign matter includes liquids (water). The housing 2 with the seal 30 is watertight. When the microwave oven 1 is used at a work site or outdoors, the seal 30 reduces entry of foreign matter into the housing 2.

The battery mounts 4 each include the guide rails 43 that guide the battery pack 15 vertically. The battery packs 15 are placed onto the battery mounts 4 from above and attached to the battery mounts 4. At a work site, the microwave oven 1 may be placed on a floor surface or on the ground when used. For the microwave oven 1 placed on a floor surface or on the ground, the user can smoothly place the battery packs 15 onto the battery mounts 4 from above.

With the battery packs 15 attached to the battery mounts 4, the upper surface 25 of the housing 2 is located above the upper surfaces 153 of the battery packs 15. With the battery packs 15 not protruding upward from the upper surface 25 of the housing 2, the microwave oven 1 avoids being upsized in the vertical direction. Additionally, the user can place an object on the upper surface 25 of the housing 2.

The battery mounts 4 include the first battery mount 41 and the second battery mount 42 adjacent to the first battery mount 41. The first battery mount 41 and the second battery mount 42 are arranged symmetrically to each other in the lateral direction. With the first battery pack 151 and the second battery pack 152 being the battery packs 15 of the same type, the microwave oven 1 has a well-balanced weight in the lateral direction. Thus, the user can smoothly carry the microwave oven 1 with the battery packs 15 attached to the battery mounts 4. Additionally, with the battery packs 15 attached to the battery mounts 4, the microwave oven 1 is less likely to fall over.

The first battery pack 151 attached to the first battery mount 41 and the second battery pack 152 attached to the second battery mount 42 are connected parallel to each other. The microwave oven 1 is thus operable for a longer period. The microwave oven 1 is also operable with the battery pack 15 attached to either the first battery mount 41 or the second battery mount 42 in the battery mounts 4.

The interface 7 is located in the front portion of the housing 2 and above the opening 13. Thus, when the microwave oven 1 is placed on a floor surface or on the ground, the user can smoothly operate the power button 71, the output switch button 72, the stop button 73, and the setting dial 74 and easily view the display 75.

The handle 9 is joined to the center portion of the housing 2 in the front-rear direction. The hinges 91 have the hinge axes extending in the lateral direction. Thus, the user can grip the handle 9 and smoothly carry the microwave oven 1 with the battery packs 15 attached to the battery mounts 4. More specifically, with the battery packs 15 attached to the battery mounts 4, the microwave oven 1 may have an imbalanced weight in the front-rear direction. The hinges 91 for the handle 9 have the hinge axes extending in the lateral direction. The user can thus grip the handle 9 and smoothly carry the microwave oven 1 having an imbalanced weight in the front-rear direction.

Other Embodiments

In the above embodiment, the seal 30 is a labyrinth seal. The seal 30 may be a rubber seal located between the first enclosure member 28 and the second enclosure member 29.

In the above embodiment, the first battery pack 151 and the second battery pack 152 are the battery packs 15 of the same type. The first battery pack 151 and the second battery pack 152 may be the battery packs 15 of the different types. For example, the first battery pack 151 and the second battery pack 152 may have different weights.

In the above embodiment, the microwave oven 1 may include a tilt angle sensor that detects the tilt angle of the microwave oven 1.

Figure 14:
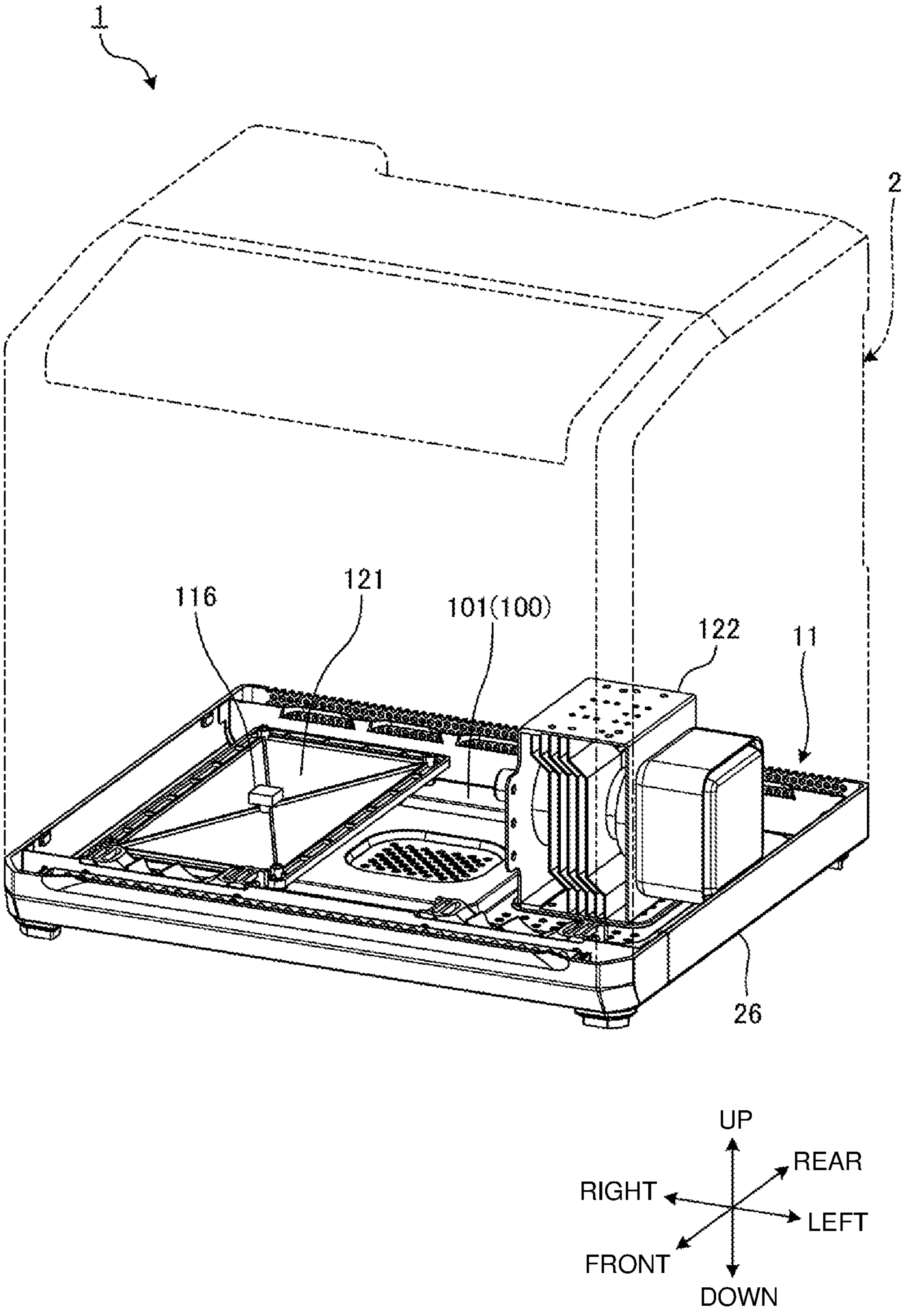
FIG. 14 is a cutaway view of the microwave oven including a tilt angle sensor in the embodiment.
Figure 15:
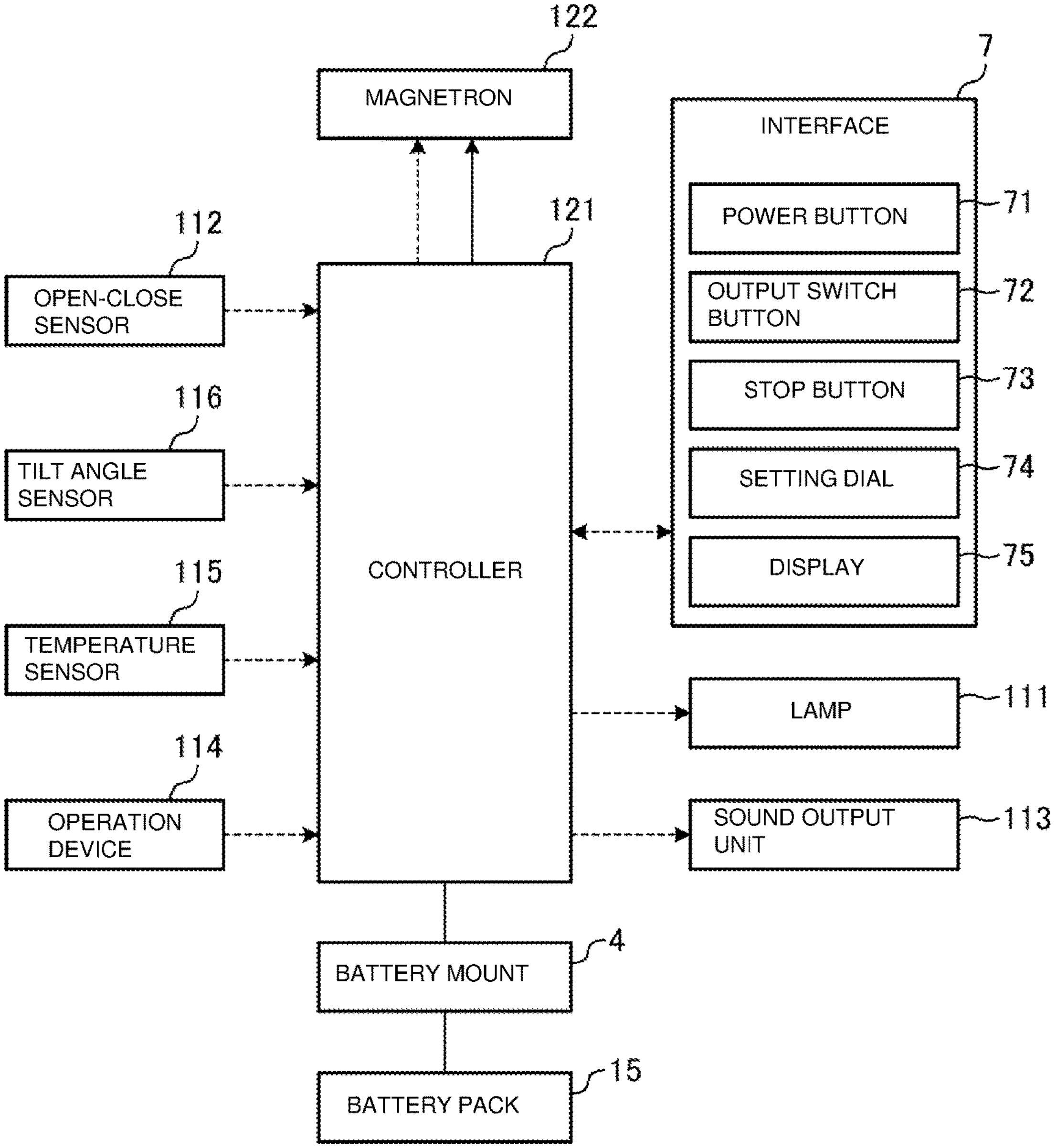
FIG. 15 is a block diagram of the microwave oven including the tilt angle sensor in the embodiment.

FIG. 14 is a cutaway view of the microwave oven 1 including a tilt angle sensor 116 in the embodiment. FIG. 15 is a block diagram of the microwave oven 1 including the tilt angle sensor 116 in the embodiment.

The tilt angle sensor 116 detects the tilt angle of the microwave oven 1 with respect to a horizontal plane. The tilt angle sensor 116 is, for example, a tilt sensor or an inertial sensor. Examples of the inertial sensor include an acceleration sensor and a gyro sensor.

The controller 121 and the magnetron 122 are located on the bottom plate 101 in the metal plate member 100. The controller 121 includes a circuit board and multiple electronic components mounted on the circuit board. Examples of the electronic components on the circuit board include a processor such as a CPU and a memory such as a ROM and a RAM. The controller 121 also includes a power circuit mounted on the circuit board.

The tilt angle sensor 116 is located in the component chamber 11 in the housing 2. The tilt angle sensor 116 is mounted on the circuit board in the controller 121. The tilt angle sensor 116 detects the tilt angle of the microwave oven 1 with respect to the horizontal plane. The tilt angle of the microwave oven 1 may be the tilt angle of the circuit board, the tilt angle of the bottom plate 101, or the tilt angle of the housing 2. In the example shown in FIGS. 14 and 15, the tilt angle sensor 116 detects, as the tilt angle of the microwave oven 1, the tilt angle of the lower surface 26 of the housing 2 with respect to the horizontal plane. When the microwave oven 1 is placed on a placement surface parallel to the horizontal plane, the lower surface 26 has a tilt angle of 0 degrees.

The controller 121 controls at least the magnetron 122 based on detection data from the tilt angle sensor 116. The controller 121 controls the magnetron 122 based on the tilt angle of the lower surface 26 detected by the tilt angle sensor 116 and a predetermined threshold. The predetermined threshold tilt angle is, for example, 30 degrees.

When determining that the tilt angle of the lower surface 26 detected by the tilt angle sensor 116 is less than the threshold, the controller 121 activates the magnetron 122 in response to the power button 71 being depressed. The controller 121 stops the operation of the magnetron 122 in response to a heating time set with the setting dial 74 elapsing.

When determining that the tilt angle of the lower surface 26 detected by the tilt angle sensor 116 is greater than or equal to the threshold, the controller 121 disables the operation of the magnetron 122. For example, when determining, before the magnetron 122 operates, that the tilt angle of the lower surface 26 is greater than or equal to the threshold, the controller 121 does not activate the magnetron 122 in response to the power button 71 being depressed. When determining, while the magnetron 122 operates, that the tilt angle of the lower surface 26 is greater than or equal to the threshold, the controller 121 stops the operation of the magnetron 122 before the heating time set with the setting dial 74 elapses.

When determining that the tilt angle of the lower surface 26 detected by the tilt angle sensor 116 is greater than or equal to the threshold, the controller 121 causes the display 75 to display display-data indicating the tilt angle of the lower surface 26 being greater than or equal to the threshold. In some embodiments, when determining that the tilt angle of the lower surface 26 detected by the tilt angle sensor 116 is greater than or equal to the threshold, the controller 121 may cause the sound output unit 113 to output a sound indicating the tilt angle of the lower surface 26 being greater than or equal to the threshold. This allows the user to notice that the microwave oven 1 is tilted.

The portable microwave oven 1 may be placed on a tilted placement surface. When the microwave oven 1 on a placement surface is tilted at an excessively large angle, the food in the cooking chamber 10 may fall on its side or the food may be heated while falling on its side. This may lower the quality of the food. The microwave oven 1 according to the embodiment is disabled from operating when the tilt angle of the microwave oven 1 is greater than or equal to the threshold. This reduces such quality degradation of the food.

REFERENCE SIGNS LIST

- 1 microwave oven
- 2 housing
- 3 door
- 4 battery mount
- 5 inlet
- 6 outlet
- 7 interface
- 8 output terminal
- 9 handle
- 10 cooking chamber
- 11 component chamber
- 12 heat-generating component
- 13 opening (first opening)
- 14 hinge
- 15 battery pack
- 16 opening (second opening)
- 17 cover plate
- 18 filter
- 19 mesh plate
- 20 fan
- 21 front surface
- 22 rear surface
- 23 left surface
- 24 right surface
- 25 upper surface
- 26 lower surface
- 27 recess
- 28 first enclosure member
- 29 second enclosure member
- 30 seal
- 31 plate
- 32 frame
- 33 first bend
- 34 second bend
- 35 labyrinth seal
- 36 latch
- 37 opening
- 41 first battery mount
- 42 second battery mount
- 43 guide rail
- 44 terminal
- 61 through-hole
- 71 power button
- 72 output switch button
- 73 stop button
- 74 setting dial
- 75 display
- 81 terminal cover
- 91 hinge
- 92 arm
- 93 grip
- 100 metal plate member
- 101 bottom plate
- 102 front plate
- 103 rear plate
- 104 through-hole
- 105 air vent
- 106 air vent
- 107 air vent
- 108 air vent
- 109 partition
- 110 ceiling plate
- 111 lamp
- 112 open-close sensor
- 113 sound output unit
- 114 operation device
- 115 temperature sensor
- 116 tilt angle sensor
- 121 controller
- 122 magnetron
- 151 first battery pack
- 152 second battery pack
- 153 upper surface
- 171 through-hole
- 191 through-hole
- 200 through-hole
- 321 base frame
- 322 cover frame
- 1091 bottom plate
- 1092 left plate
- 1093 right plate

What is claimed is:

1. A microwave oven, comprising:

a housing including a cooking chamber inside the housing, a component chamber inside the housing, a front surface having a first opening communicating with the cooking chamber, and a rear surface having a battery mount configured to detachably receive a battery pack, and an outlet allowing air to be discharged from the component chamber to flow through the outlet, the outlet located below the battery mount;

a heat-generating component in the component chamber; and a door at a front portion of the housing, the door being configured to cover and uncover the first opening, wherein with the battery pack attached to the battery mount, the battery pack protrudes from the rear surface.

2. The microwave oven according to claim 1, wherein the front surface has an inlet that allows air to be drawn into the component chamber to flow through the inlet.

3. The microwave oven according to claim 2, wherein the inlet is below the first opening.

4. The microwave oven according to claim 2, wherein the housing includes a second opening communicating with the component chamber, the microwave oven further comprises a cover plate removably received in the second opening, and the cover plate has a through-hole, and the inlet includes the through-hole.

5. The microwave oven according to claim 2, further comprising:

a filter configured to collect foreign matter from air drawn in through the inlet.

6. The microwave oven according to claim 5, wherein the filter faces the inlet inside the housing.

7. The microwave oven according to claim 1, wherein the component chamber is below the cooking chamber.

8. The microwave oven according to claim 1, further comprising:

a metal plate member inside the housing, wherein the heat-generating component is supported by the metal plate member.

9. The microwave oven according to claim 8, wherein the metal plate member includes a bottom plate, and the heat-generating component is supported on the bottom plate.

10. The microwave oven according to claim 9, wherein the metal plate member includes a front plate connected to a front portion of the bottom plate and having a first air vent, and a rear plate connected to a rear portion of the bottom plate and having a second air vent.

11. The microwave oven according to claim 8, further comprising:

a hinge joining the door to the metal plate member, the hinge having a hinge axis extending in a vertical direction; and an output terminal in a front portion of the housing and below the hinge.

12. The microwave oven according to claim 11, wherein the output terminal outputs power from the battery pack.

13. The microwave oven according to claim 1, wherein the housing includes a first enclosure member, a second enclosure member, and a seal at a boundary between the first enclosure member and the second enclosure member.

14. The microwave oven according to claim 13, wherein the seal includes a first bend at an end of the first enclosure member, and a second bend at an end of the second enclosure member.

15. The microwave oven according to claim 1, wherein the battery mount includes a guide rail to guide the battery pack in a vertical direction, and the battery pack is placed onto the battery mount from above and attached to the battery mount.

16. The microwave oven according to claim 15, wherein with the battery pack attached to the battery mount, an upper surface of the housing is above an upper surface of the battery pack.

17. The microwave oven according to claim 1, wherein the battery mount includes a first battery mount and a second battery mount, and the first battery mount and the second battery mount are lateral to each other.

18. The microwave oven according to claim 17, wherein a first battery pack attached to the first battery mount and a second battery pack attached to the second battery mount are connected parallel to each other.

19. The microwave oven according to claim 1, further comprising:

a handle joined to an upper portion of the housing with a hinge having a hinge axis extending in a lateral direction; and an interface in a front portion of the housing and above the first opening, the interface including at least a power button.

20. A microwave oven, comprising:

a housing including a cooking chamber inside the housing, a component chamber inside the housing, a front surface having a first opening communicating with the cooking chamber, and a rear surface having a battery mount configured to detachably receive a battery pack, the battery mount located at an upper portion of the rear surface, and an outlet allowing air to be discharged from the component chamber to flow through the outlet;

a heat-generating component in the component chamber; and a door at a front portion of the housing, the door being configured to cover and uncover the first opening, wherein with the battery pack attached to the battery mount, the battery pack protrudes from the rear surface, and with the battery pack attached to the battery mount, an upper surface of the housing is above an upper surface of the battery pack.

* * * * *